Jan. 18, 1966   W. R. LEOPOLD, JR., ET AL   3,229,704
MAIN AND SERVICE LINE CONNECTION EMBODYING A SELF-TAPPING
NIPPLE AND A FUSIBLE PLUG - METHOD AND APPARATUS
Filed Dec. 16, 1963   3 Sheets-Sheet 1
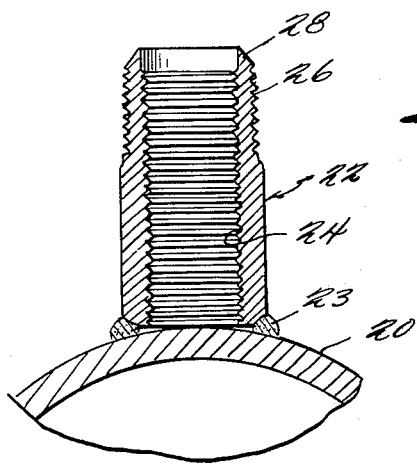
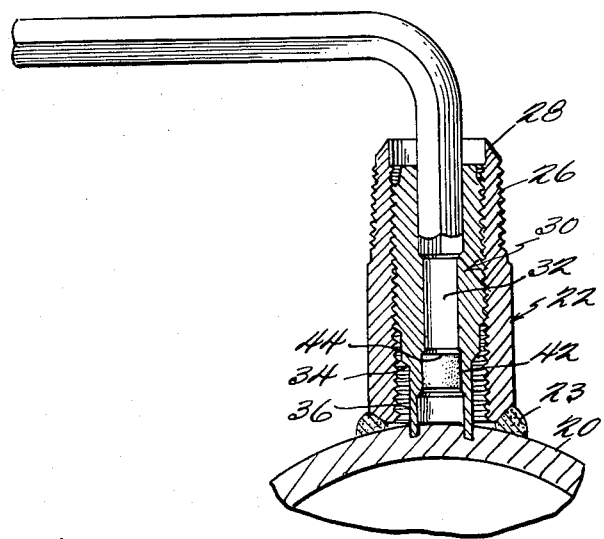
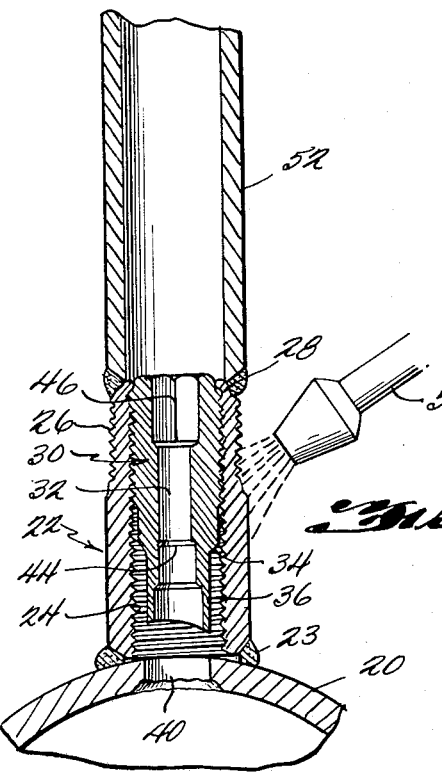
INVENTORS
WILBUR R. LEOPOLD, JR.
JOHN J. SMITH
LAWRENCE F. LUCKENBILL
BY
Cushman, Darby & Cushman
ATTORNEYS

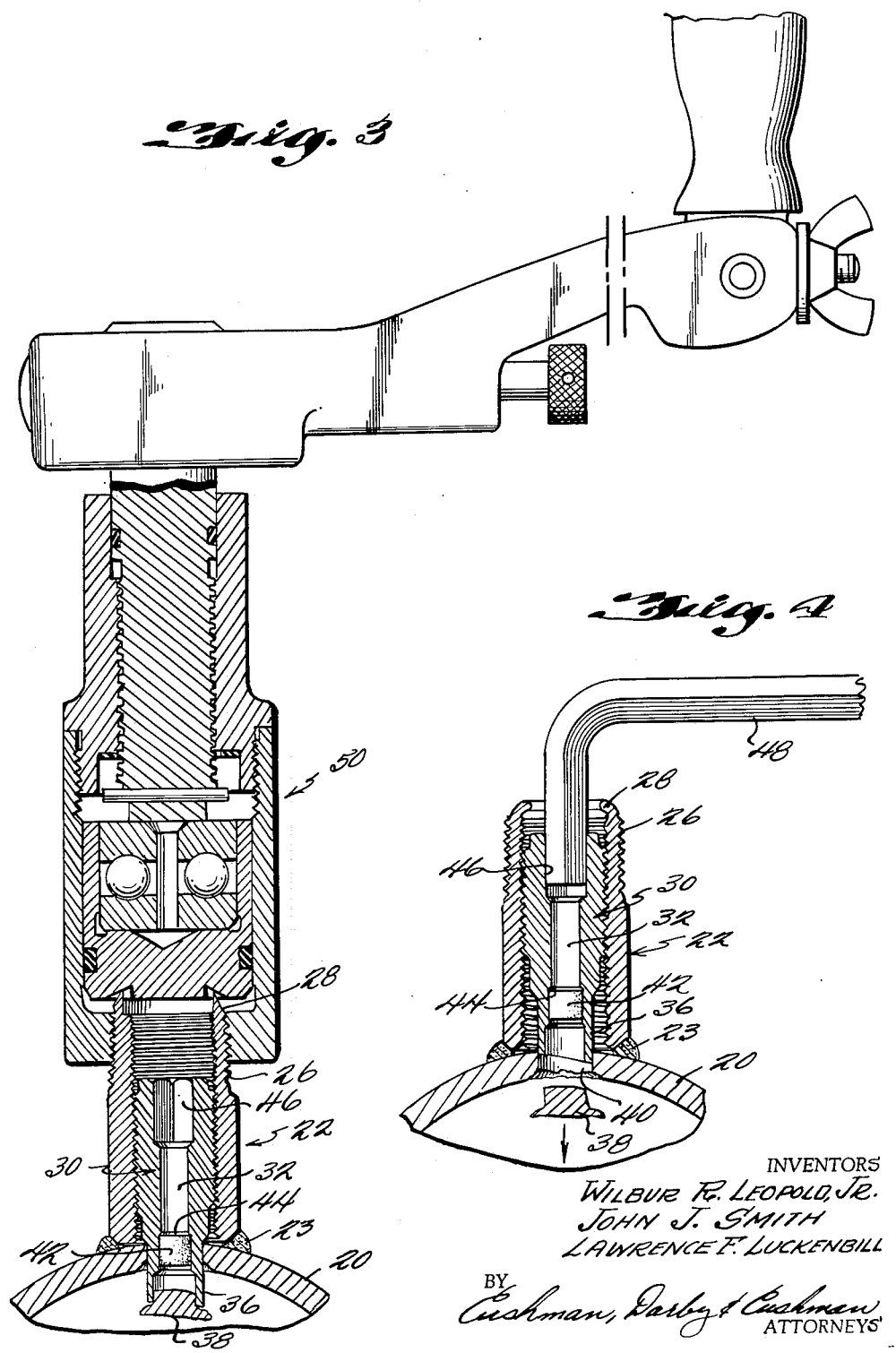

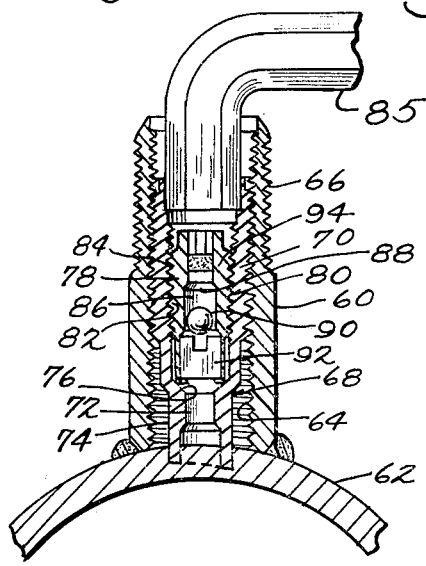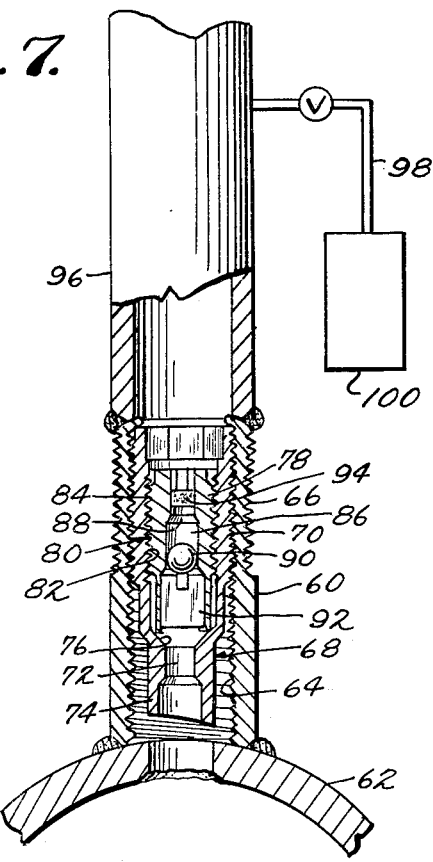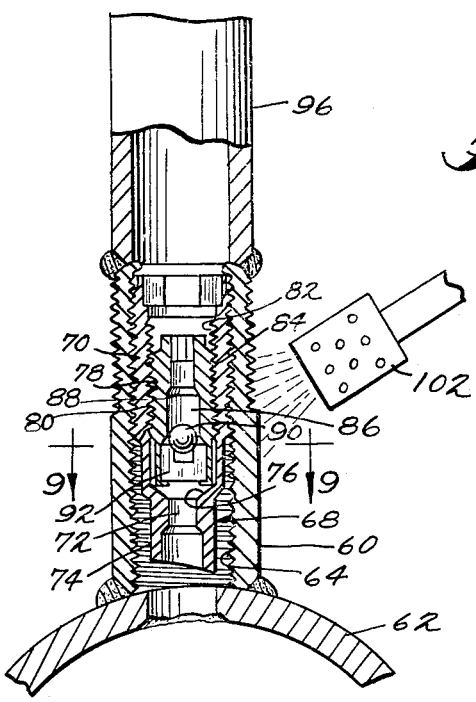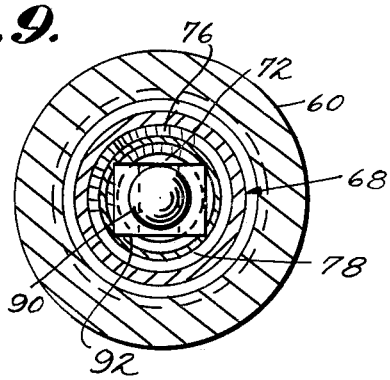

United States Patent Office 3,229,704
Patented Jan. 18, 1966

3,229,704
MAIN AND SERVICE LINE CONNECTION EMBODYING A SELF-TAPPING NIPPLE AND A FUSIBLE PLUG—METHOD AND APPARATUS
Wilbur R. Leopold, Jr., John J. Smith, and Lawrence F. Luckenbill, Decatur, Ill., assignors to Mueller Co., Decatur, Ill., a corporation of Illinois
Filed Dec. 16, 1963, Ser. No. 330,692
10 Claims. (Cl. 137—74)

This invention relates to improvements in methods and apparatus for connecting a service line to a street main without escape of fluid from the main to the atmosphere. More particularly, this invention relates to an improved self-tapping fitting, and method of using the same, for connecting a service line to a main.

This application is a continuation-in-part of our copending application Serial No. 222,493, filed September 10, 1962, now abandoned.

Self-tapping fittings for connecting a service line to a main without escape of fluid from the main to the atmosphere are known in the art. In the past, however, all such fittings have been in the form of a service T having a through bore and a lateral outlet with one end of the T, i.e., the inlet end of the bore, being adapted to be secured radially to a main and with the outlet being adapted to have a service line connected thereto. In one form of a self-tapping service T, the bore is interiorly threaded and after the T is secured to a main and a service line is connected to the lateral outlet, an exteriorly threaded plug is inserted in the open or other end of the T bore and engaged with the bore threads. The plug carries means on its inner end for perforating the wall of the main by screwing the plug forwardly thereagainst. After the main has been perforated, the plug is retracted sufficiently to allow fluid to flow from the main through the T bore to the lateral outlet and thus establish service while at the same time the plug serves to block the outer end of the T bore and prevent the escape of fluid to the atmosphere. Thereafter the outer end of the T may be provided with a conventional closure cap to form an additional seal.

While self-tapping service T's of this type have proved to be satisfactory for their intended purpose, improvements in self-tapping fittings can be made. For example, a service T is relatively expensive as compared to an interiorly threaded nipple.

The use of a nipple, as contrasted to a service T, to connect a service line to a main, also is known. Such known use, however, requires a separate drilling machine, a separate drilling valve through which the operation of drilling the main is conducted, and various separate operations not necessary with a self-tapping fitting.

Service lines, though normally buried, are susceptible to damage and even rupture, as by careless excavating operations, with consequent escape of line fluid to the atmosphere. In the event that the fluid is gas, an extremely dangerous situation will exist.

Accordingly, it is an object of this invention to provide an improved method and apparatus for connecting a service line to a main without escape of fluid from the main to the atmosphere.

It is another object of this invention to provide an improved and less expensive self-tapping fitting for connecting a service line to a main.

It is a further object of this invention to provide a self-tapping nipple and a novel method of using the same for connecting a service line to a main without escape of fluid from the main to the atmosphere.

It is still another object of this invention to provide an improved self-tapping fitting of the type under consideration which not only can be used to connect a service line to a main without escape of fluid from the main to the atmosphere, but also embodies an excessive-flow-safety valve which, after the connection has been made, will thereafter shut off service in the event of excessive-flow caused by fracture, or a break or the like in the service line beyond the valve.

Other objects and advantages of the invention will become apparent from the following description and accompanying drawings, in which:

FIGURE 1 is a fragmentary vertical sectional view showing an interiorly threaded nipple secured to the wall of a main in accordance with this invention;

FIGURE 2 is a view corresponding to FIGURE 1 but illustrating the operation of a perforating tool in conjunction with the nipple to perforate the wall of the main;

FIGURE 3 is a view corresponding to FIGURE 2 but showing the condition of the parts after the wall of the main has been perforated and also the application of a crimping tool to the outer end of the nipple;

FIGURE 4 is a view corresponding to FIGURE 3 showing the condition of the parts prior to the connection of a service line to the outer end of the nipple;

FIGURE 5 is a view corresponding to FIGURE 4 showing a service line connected to the outer end of the nipple and the establishment of service;

FIGURE 6 is a view corresponding to FIGURE 4 but illustrating a modified form of perforating tool which embodies an excessive-flow-safety valve;

FIGURE 7 is a view corresponding to FIGURE 6 but showing a service line connected to the outer end of the service nipple and a source of fluid under pressure connected to such line in order to pressure-test the same before service is established.

FIGURE 8 is a view corresponding to FIGURE 7 but showing the step of establishing service; and FIGURE 9 is an enlarged sectional view taken substantially on the line 9—9 of FIGURE 8.

Referring now to the drawings, there is shown in FIGURE 1 a portion of the wall of a street main 20, for example a gas main carrying gas under pressure. In order to connect a service line, leading to a dwelling or the like, to the main 20 in accordance with this invention, one end of a nipple 22 is secured radially and exteriorly to the wall of the main. Such connection preferably will be made by welding, as shown at 23 in the drawings, but can be made by other means known in the art, for example, by the use of a service clamp (not shown). The nipple 22 is provided with interior threads 24 for substantially its entire length and with exterior threads 26 on its outer end portion. For reasons later explained, the terminal outer end of the nipple 22 is provided with an exteriorly beveled and interiorly enlarged portion 28.

Referring now to FIGURE 2 of the drawings, after the nipple 22 has been welded to the main 20, there is inserted into the outer end of the nipple a perforating tool 30 in the form of an exteriorly threaded plug having a longitudinal coaxial through passageway 32. The inner end of the tool 30 is provided with a tapering section 34 which merges into a reduced cylindrical section 36, having the end edge thereof shaped, as known in the art, to perforate the wall of the main 20 on rotative engagement therewith as the tool is screwed into the nipple 22 and advances against the main. Preferably, the end of the perforating tool 30 is adapted to remove a generally mushroom-shaped slug or coupon 38 from the wall of the main 20, as shown in FIGURE 3, the stem of such slug being received within the end of the reduced cylindrical section 36 and the cap or head of the slug being of a diameter slightly greater than the exterior diameter of such section, i.e., slightly larger than the minimum cross-section of the hole 40 made in the main by the perforating tool. As a result of the action of the tool 30, the hole is slightly flared at its inner end. For reasons later described, it is desirable that the perforating end of the tool 30 be configured so that the slug 38, after the main 20 has been perforated, will readily drop away from the tool and into the main without sticking in the end of the cylindrical section 36 as shown in FIGURE 3.

The through passageway 32 in the tool 30 is blocked by a plug 42 of relatively low melting point, i.e., fusible, material. Normally the nipple 22 and the main 20 will be made of iron or steel and such fusible plug 42 can be made of a low melting point metal or alloy, e.g., lead, a lead-tin alloy or the like. The plug 42 is located sufficiently rearwardly of the perforating end of the tool 30 so as not to interfere with the perforating action thereof. Desirably, however, the plug 42 is seated against a forwardly facing shoulder 44 in the passageway 32, or otherwise suitably anchored therein, so that the pressure of gas in the main 20, after the latter has been perforated as shown in FIGURE 3 will not immediately blow the plug out of the passageway.

The outer end portion 46 of the passageway 32 is of non-circular configuration, e.g., hexagonal, for the reception of an end of an appropriate wrench 48, e.g., a conventional Allen wrench, as shown in FIGURE 2. After the perforating tool has been inserted into the nipple 22, the wrench 48 is engaged with the tool and operated to screw the tool forwardly into engagement with and to perforate the wall of the main 20, as shown in FIGURES 2 and 3 of the drawings.

After the main 20 has been perforated, a crimping tool 50, of the type disclosed in detail in the copending U.S. application of Frank H. Mueller et al., Serial No. 190,681 now Patent No. 3,130,483, is threaded onto the outer end of the nipple 22, as shown in FIGURE 3, and operated to deform and inwardly crimp the outer end portion 28 of the nipple, as shown in FIGURE 4, so that when the perforating tool 30 is retracted, as later described, from the nipple the inturned deformation of the nipple will be engaged by the other end of the tool 30 and form a seal therewith, as shown in FIGURE 5. In this connection the outer end of the tool preferably is relieved slightly or chamfered so as to seal more effectively with the inturned portion of the nipple created by the aforedescribed crimping operation.

In some instances, after the main 20 has been perforated as described, the mushroom-shaped slug 38, which is removed from the wall of the main in the perforating operation, may stick or jam in the outer end of the perforating tool 30, as shown in FIGURE 3, so as to prevent the flow of gas through the passageway 32 in the tool. As described above, however, the major diameter of the slug 38 is normally of greater diameter than the hole 40 in the main 20. Consequently, when the perforating tool 30 is retracted sufficiently, i.e., by unscrewing the same by means of the wrench 48, the slug 38 will be pulled out of the inner end of the tool and will fall into the main 20, as shown in FIGURE 4, so as to permit gas to flow into the inner end of the passageway 32 up to the plug 42. Preferably, the perforating tool 30 is completely retracted to the position shown in FIGURE 5 wherein the outer end will sealingly engage the inwardly crimped portion 28 of the nipple 22 so as to effectively prevent leakage of gas outwardly between the interengaged threads on the tool and in the nipple.

Thereafter, a service line 52 can be butt welded to the outer end of the nipple 22, as shown in FIGURE 5. After the line 52 has been connected to the nipple 22, the line, and the house piping, desirably is tested for leaks by introducing fluid under pressure, e.g., compressed air, thereinto. After the line 52 has been leakage tested, and any leaks repaired, service is established by applying sufficient heat, such as by an appropriate torch 54 or the like, to the exterior of the nipple 22 to cause the plug 42 to soften or melt sufficiently for the pressure in the main 20 to blow the fusible material of the plug out of the passageway 32 and into the line 52 where it will re-harden into particles of a size which will not interfere with the flow of gas through the line.

Referring now to FIGURES 6 to 9 there is shown a modified form of the invention wherein the self-tapping fitting includes an excessive-flow-safety valve. As in the previously described embodiment the modified arrangement includes a service nipple 60 secured, as by welding, radially and exteriorly to the wall of a main 62. The nipple 60, which may be substantially identical to the nipple 22 shown in FIGURES 1 to 5, is provided with interior threads 64 for substantially its entire length and with exterior threads 66 on its outer end portion. After the nipple 60 has been welded to the main 62, there is inserted into the outer end of the nipple a modified form of perforating tool 68 in the form of an exteriorly threaded plug 70 having a longitudinal coaxial through passageway 72. The inner end of the tool 68 is provided with a reduced cylindrical section 74 having the end edge thereof shaped, as previously described with regard to the tool 30, shown in FIGURES 1 to 5, to perforate the wall of the main 62 on rotative engagement therewith as the tool is screwed into the nipple 60 and advances against the main.

Rearwardly or outwardly of the perforating end of the tool 68, the through passageway 72 is interiorly enlarged to provide a rearwardly or outwardly facing shoulder 76 against which may be seated the forward end of a sleeve-like member 78 forming the body of an excessive-flow-safety valve 80, preferably of the type shown in the U.S. patent to Jerman 2,569,316, and also substantially identical to the excessive-flow-safety valve shown in our copending application Serial No. 222,495, filed September 10, 1962. Rearwardly or outwardly of the shoulder 76 the through passageway 72 is provided with interior threads 82 engaged with exterior threads 84 on the sleeve-like member 78 of the valve 80 in order to retain the latter in place within the passageway. Outwardly or rearwardly of the interior threads 82 the outer end portion of the passageway 72 is of non-circular configuration, e.g., hexagonal, as shown in the drawings, for the reception of the complementary end of a wrench 85 employed to turn the tool 68 to perforate the wall of the main 62 as aforedescribed.

Since the excessive-flow-safety valve 80 is described in detail in our aforementioned copending application Serial No. 222,495, there is no need for a receptitious detail description here. It is sufficient to point out that the body 78 of the valve 80 is provided with a through flow passage 86 which is interiorly reduced intermediate its ends to provide an inwardly facing valve seat 88 engageable by a valve ball 90. The ball 90 is of a diameter only slightly less than the interior diameter of the flow passage 86 inwardly of the valve seat 88 to provide a restriction to flow through the passage 86. Secured within the inner end of the flow passage 86 is a generally U-shaped permanent magnet 92 positioned so as to normally attract and hold the ball 90 out of engagement with its seat 88. The magnet 92 is generally flat in transverse section, as shown in FIGURE 9, so as to provide for flow of fluid on opposite sides thereof through the passage 86.

The attractive force of the magnet 92, the weight of the ball 90, and the size of the flow restriction between the ball and the walls of the flow passage 86 are so proportioned that the magnet normally retains the ball unseated. On the other hand, if outward flow through the passage 86 exceeds a predetermined rate, it will be seen that the ball 90 will be forced off of the magnet 92 onto the valve seat 88 and thus shut off flow of fluid through the nipple 60.

Outwardly beyond the valve seat 88 the flow passage 86 is blocked by a fusible plug 94 having softening or melting characteristics substantially identical to those of the plug 42 previously described with reference to FIGURES 1 to 5 of the drawings. It will be seen that the fusible plug 94 can readily be cast or otherwise molded in position in the flow passage 86 so as to be normally securely retained in place therein. Outwardly beyond the fusible plug 94, the flow passage 86 may be of non-circular configuration for engagement by an appropriate wrench (not shown) in order to screw the excessive-flow-safety valve into the perforating tool 68.

After the main 62 has been perforated by the tool 68, the outer end of the nipple 60 has been crimped over, and the perforating tool retracted into sealing engagement with the crimped-over portion, in the same manner as heretofore described with reference to FIGURES 1 to 5 of the drawings, a service line 96 is secured, as by welding, or any other appropriate manner known in the art, to the outer end of the nipple 60, as shown in FIGURE 7. The line 96 and the house piping (not shown) then may be tested for leaks by introducing fluid under pressure, e.g., compressed air, into the line via a connection 98 from an appropriate source 100. After the line 96 has been leakage tested, and any leaks repaired, service is established by applying sufficient heat, as by an appropriate torch 102 or the like, to the exterior of the nipple 60 to cause the fusible plug 94 to soften or melt sufficiently for the pressure in the main 62 to blow the fusible material of the plug 94 out of the passage 86 and into the line where it will reharden into particles of a size which will not interfere with the flow of fluid through the line.

After service has been thus established, it will be seen that the excessive-flow-safety valve 80 will become operative to shut off flow from the main 62 through the nipple 60 into the line 96 on the occurrence of any condition, usually rupture of the line, which will result in flow through the valve above a predetermined rate, such rate usually being slightly in excess of the rate of flow through the line occasioned by normal demand for service.

It thus will be seen that the objects of this invention have been fully and effectively accomplished. It will be recognized, however, that various changes can be made to the embodiment specifically shown and described to illustrate the principles of this invention without departure from such principles. Accordingly, this invention includes all modifications encompassed within the spirit and scope of the following claims.

What is claimed is:

1. The method of connecting a service line to a main without escape of appreciable fluid from the main to the atmosphere, the steps comprising: securing fluid-tight to the wall of the main one end of an interiorly-threaded nipple; inserting into the other end of the nipple, into engagement with the threads therein, an exteriorly-threaded plug provided with means on the inner end thereof for perforating the wall of the main by rotative-advancement of the plug thereagainst, provided with a longitudinal through passageway and provided with a plug of material blocking the passageway and having a lower melting point than the main, nipple, and exteriorly-threaded plug; rotating and advancing the plug into engagement with and perforating the wall of the main; connecting a service line fluid-tight to the other end of the nipple; and melting the low melting point plug by application of heat to the exterior of the nipple to unblock the passageway and permit fluid to flow from the main to the line and establish service.

2. The method defined in claim 1 including the additional steps, prior to the melting step, of pressure-testing the service line for leakage and repairing any leaks leaks discovered by the test.

3. The method defined in claim 1 in which the perforating means removes a generally inverted mushroom-shaped plug from the wall of the main and including the additional step prior to the melting step of retracting the threaded plug from the main to insure removal of the mushroom-shaped plug from the inner end of the passageway.

4. The method defined in claim 3 including the additional step, prior to the retracting step, of radially-inwardly deforming the other end of the nipple to prevent withdrawal of the threaded plug therefrom.

5. The method of connecting a service line to a main without escape of appreciable fluid from the main to the atmosphere, the steps comprising: securing fluid-tight to the wall of the main one end of an interiorly-threaded nipple; inserting into the other end of the nipple, into engagement with the threads therein, an exteriorly-threaded plug provided with means on the inner end thereof for perforating the wall of the main by rotative-advancement of the plug thereagainst, provided with a longitudinal through passageway, provided with a plug blocking the passageway and of material having a lower melting point than the main, the nipple, and the exteriorly-threaded plug, and provided with excessive-flow-safety-valve means disposed in the passageway between the low melting point plug and the inner end of the exteriorly-threaded plug, the valve means being operative to shut off flow of fluid from the main through the passageway, when unblocked, whenever such flow exceeds a predetermined rate; rotating and advancing the exteriorly-threaded plug into engagement with and perforating the wall of the main; connecting a service line fluid-tight to the other end of the nipple; and melting the low melting point plug by application of heat to the exterior of the nipple to unblock the passageway and permit fluid to flow from the main to the line and establish service and at the same time protect against escape of fluid to the atmosphere from the line in the event of rupture thereof.

6. The method defined in claim 5 including the additional steps, prior to the melting step, of pressure-testing the service line for leakage and repairing any leaks discovered by the test.

7. Apparatus for connecting a service line to a main without escape of appreciable fluid from the main to the atmosphere, comprising: an interiorly-threaded nipple adapted to have one end thereof secured fluid-tight to the wall of the main; an exteriorly-threaded plug adapted to engage the nipple threads and having means on the inner end of said plug for perforating the wall of the main on rotative-advancement of said plug thereagainst, said plug having a longitudinal through passageway; and a plug of material blocking said passageway and having a lower melting point than the main, said nipple, and said exteriorly-threaded plug.

8. Apparatus for connecting a service line to a main without escape of appreciable fluid from the main to the atmosphere, comprising: an interiorly-threaded nipple adapted to have one end thereof secured fluid-tight to the wall of the main; an exteriorly-threaded plug adapted to engage the nipple threads and having means on the inner end of said plug for perforating the wall of the main on rotative-advancement of said plug thereagainst, said plug having a longitudinal through passageway; a plug blocking said passageway and of material having a lower melting point than the main, said nipple, and said exteriorly-threaded plug; and excessive-flow-safety-valve means disposed in said passageway between said low melting point plug and said inner end of said exteriorly-threaded plug, said valve means being effective to shut off flow of fluid through said passageway, when unblocked, from said inner end whenever such flow exceeds a predetermined rate.

9. A perforating tool for use with an interiorly-threaded fitting to connect a service line to a main without escape of fluid to the atmosphere, comprising: an exteriorly-threaded plug having a longitudinal through passageway; means on one end of said plug for perforating the wall of a main on rotative-advancement thereagainst to establish communication between said passageway and the interior of the main; non-circular means on the other end of said plug detachably engageable by a turning tool to rotate said plug and advance the same against the main to perforate the latter; and a plug blocking said passageway and of material having a lower melting point than said exteriorly-threaded plug.

10. A perforating tool for use with an interiorly-threaded fitting to connect a service line to a main without escape of fluid to the atmosphere, comprising: an exteriorly-threaded plug having a longitudinal through passageway; means on one end of said plug for perforating the wall of a main on rotative-advancement thereagainst to establish communication between said passageway and the interior of the main; non-circular means on the other end of said plug detachably engageable by a turning tool to rotate said plug and advance the same against the main to perforate the latter; a plug blocking said passageway and of material having a lower melting point than said exteriorly-threaded plug; and excesive-flow-safety-valve means disposed in said passageway between said one end and said low melting point plug, said valve means being effective to shut off flow of fluid from said one end through said passageway, when unblocked, whenever said flow exceeds a predetermined rate.

References Cited by the Examiner
UNITED STATES PATENTS

| | | | |
|---|---|---|---|
| 2,414,911 | 1/1947 | Temple | 137—318 XR |
| 3,026,903 | 3/1962 | Roach | 251—65 XR |
| 3,104,456 | 9/1963 | Powell | 137—318 XR |

ISADOR WEIL, *Primary Examiner.*